Sept. 20, 1971  H. SCHMIDT AUF ALTENSTADT ET AL  3,605,773
GAS FLOW REGULATOR
Filed June 22, 1970
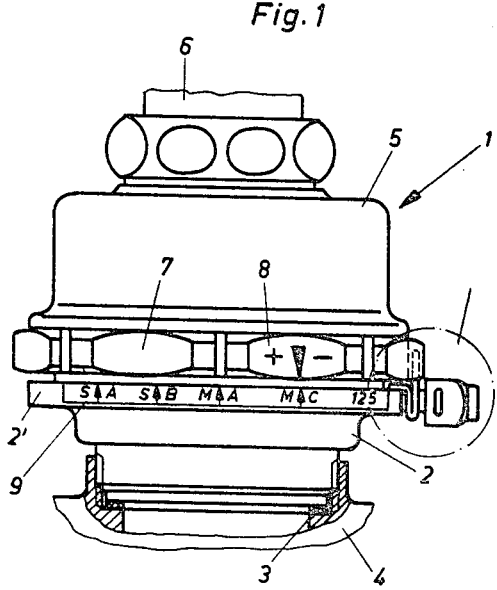
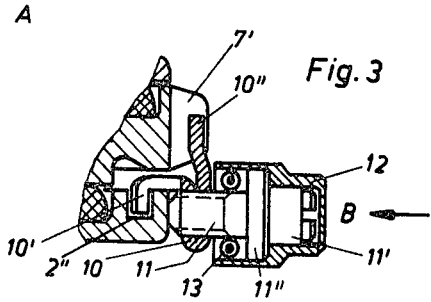
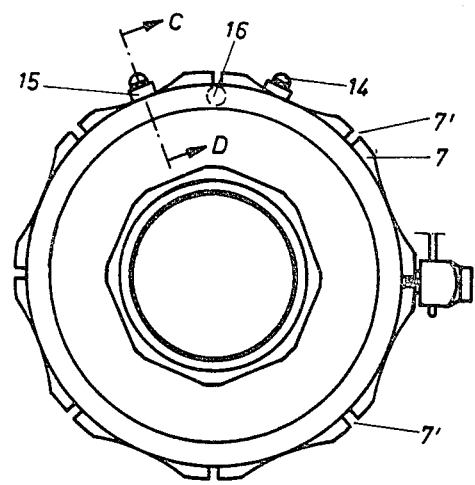
HELMUT SCHMIDT
AUF ALTENSTADT
ERNST SOHNCHEN
INVENTORS
BY
Darbo, Robertson &
Vandenburgh

United States Patent Office 3,605,773
Patented Sept. 20, 1971

3,605,773
GAS FLOW REGULATOR
Helmut Schmidt auf Altenstadt, Remscheid-Reinshagen, and Ernst Sohnchen, Huckeswagen, Germany, assignors to Joh. Vaillant KG., Remscheid, Germany
Filed June 22, 1970, Ser. No. 48,265
Claims priority, application Germany, June 24, 1969,
P 19 31 898.0
Int. Cl. F17d 1/02, 3/00
U.S. Cl. 137—1                                     7 Claims

ABSTRACT OF THE DISCLOSURE

A gas flow regulator has a ring rotatable with respect to the body for adjusting the performance of the regulator as required by the conditions. A pointer is mounted on the ring in juxtaposition to scale indicia on the body to indicate the setting of the adjustment ring. These are applied after the regulator is installed so that they will be on the front of the installed regulator. A sealed locking clamp prevents rotation of the ring.

BACKGROUND AND SUMMARY OF THE INVENTION

The German patent specification 1,138,953 relates to a gas flow regulator with an adjustable set value in which the regulator housing comprises a lower housing part containing the gas inlet and a bell-shaped upper part containing the gas exit, in which a float, adapted to control a regulating port and forming a restricting annular gap with a float casing disposed coaxially in the upper part of the housing and in which an adjusting collar, encompassing the float casing, is sealingly and rotatably disposed on the lower housing part, containing said float casing, so as to leave a space between upper and lower housing parts, the interior of said adjusting collar being provided with radial ports, communicating with the space between the upper housing and the float casing and being adapted to cover, to a greater or lesser extent, the apertures provided in this zone on the float casing.

It is an object of the present invention to enable a gas flow regulator of the kind heretofore described to be adjustable in a simple manner for different standardized gases. To this end, the invention provides that the regulator housing is provided with a scale which co-operates with a pointer disposed on the adjusting collar.

The invention is based on the knowledge that each of the aforementioned different gases is associated with a clearly defined position of the adjusting collar to enable adjustment to be made by means of a scale.

Since the position of identical gas flow regulators in the installed state is not necessarily uniform, owing to the screwed connection to the gas tap of the apparatus, and since the scale should always be disposed to be easily visible from the front, it is advantageously provided that the scale and the mark are separate components which can be mounted after installation of the regulator, for example by adhesive mounting. After installation of the gas flow regulator into the apparatus, the regulator can be adjusted to the set value of a defined gas. The scale and mark are then mounted superjacently on the regulator housing or adjusting collar respectively in a position which is easily visible, the mounting being performed, for example, by adhesive fixing.

To enable the regulators to be adjusted at the installation site to a kind of gas (standard gas) different from that to which they are adjusted at the works, it is necessary for the collars of all regulators to be adjusted by the same angle of rotation. This is due to the fact that the regulators are identical to each other (shape parts). The amount of adjustment of regulators of the same type of apparatus may therefore be defined on a scale. It is therefore easy for the installer to reset the adjusting collars to the required setting for the locally available type of gas. After adjustment, the collar is locked by means of a clamp in the same way as is disclosed in the Federal German patent specification 1,138,953. Regulators for kinds of apparatus having a larger or smaller output are provided with corresponding scales.

In regulators which are incorporated into the apparatus an annular groove is provided on the lower housing part on an annular surface thereof which faces the adjusting collar but is disposed at a distance therefrom and that a C-clamp for locking the adjusting collar hooks into the annular groove and can be locked in place by means of a screw. This clamp has an upwardly orientated projection which extends into a vertically extending slot on the adjusting collar. In this way the clamp will not exert pressure on the upper and lower parts of the regulator in parallel to the regulator axis as in the German patent specification 1,138,953.

It is advantageous for manufacturing purposes if the C-clamp is provided with a lug, disposed in the zone of the screw, said lug being bent upwardly and forming the projection which extends upwardly into the groove of the adjusting collar, with the clamping screw extending through the C and through the bent lug.

If the local set value should differ from the set value marked on the scale, appropriate correction is made by the installer by adjusting the regulator, after which he applies the clamp and seals it in place.

It may be appropriate for the aforementioned correcting zone to be confined within certain limits as regards a specified set value. To this end, a downwardly extending cam is mounted on the underside of the regulator. One stop clamp each for defining the correcting zone is provided on the edge of the underpart of the regulator on both sides of the cam and for a standard set value to which the scale is adjusted.

DESCRIPTION OF THE DRAWINGS

FIG. 1 is a front view of the regulator in the installed position;

FIG. 2 is a plan view of the regulator according to FIG. 1;

FIG. 3 shows the area A of the regulator illustrated in FIG. 1 in section on an enlarged scale;

FIG. 4 is a front view of the ring segment as seen in the direction B in FIG. 3; and FIG. 5 is a section on the line C–D in FIG. 2.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The underpart 2 of the regulator 1 is threaded onto the gas supply connection 4 with the interposition of a gasket 3. The gas from the regulator passes through the upper part 5 of the regulator 1 into the burner 6. A mark 8 (including a pointer) is provided on the adjusting collar 7. The set value can be adjusted in accordance with the kind of gas by rotating the collar 7 so that the mark 8 is positioned above the correct value on the scale 9 bearing the information indicia. The scale 9 is mounted on the upper face 2' of the stationary bottom part 2 of the regulator.

The correct position of the collar relative to the regulator housing is established on the regulator before it is installed into the apparatus and, after installation into the apparatus, the scale and the mark are mounted at the front without altering the pre-adjusting position of the regulator, the mark pointing to the pre-adjusted value on the scale.

A C-clamp 10 has a downwardly oriented hook 10' extending into a groove 2" of the bottom body part 2. Groove 2" is covered by the collar 7 but spaced below the collar. C-clamp 10 has an upwardly extending projection 10" which fits into one of the slots 7' on the circumfeernce of the collar 7. The C-clamp and its projection are bent from a single length of metal. In the area where they join, the metal is thereby doubled in thickness and a screw 11 is threaded through this doubled area. The head 11' of the screw 11 is covered by a cap 12. To prevent operation of the clamping screw 11 by unauthorized persons, the cap 12 has two pair of transverse openings 12' to enable a lead seal wire 13 to be inserted. The openings 12' for the wire are disposed on the cap 12 behind the shoulder 11" of the screw 11. So long as the seal wire 13 remains in place the cap cannot be withdrawn.

To enable the installer to adjust the loading accurately in the event of possible deviation from the standard value of the gas, the wire 13 is not yet sealed when the apparatus is supplied and the cap can be removed. Corrections may therefore be performed by the installer. Only when this has been done, or, in the standard case, when the loading has been tested, the C-clamp is fixed in place and the cap is sealed thereover. In order to provide initial limitation for the adjustability of the ring segment in one (+) or the other (−) direction it is possible that during manufacture two additional C-clamps 15, secured by grab screws 14 (see FIG. 5 and FIG. 2) are provided which can be secured on the underpart 2 of the regulator in the same manner as the C-clamp 10. A cam 16 extends from the underside of the ring 7 between clamps 15. It thereby limits rotation of the ring by abutting against one of the adjacent clamps 15. Thus, the clamp 10 can be adjusted only within predefined limits in one or the other direction relative to the standard value stated on the scale. Any impermissible underloading or overloading is thus avoided.

We claim:

1. In a gas flow regulator for controlling the flow of fuel gas to a gas heated appliance adapted to operate with a variety of standardized gas types and having a lower housing part and a ring part above said housing part and rotatable with respect to the housing part for establishing the required flow control condition, the improvement comprising:

first means on one of said parts defining a scale; and
second means on the other of said parts in juxtaposition to the first means and defining a pointer, said scale bearing scale markings, said regulator regulating a gas flow, when each of said scale markings is in alignment with said pointer, demanded by said gas heated appliance when operated with one of said standardized gas types.

2. In a gas flow regulator for controlling the flow of fuel gas to a gas heated appliance adapted to operate with a variety of standardized gas types and having a lower housing part and a ring part above said housing part and rotatable with respect to the housing part for establishing the required flow control condition, the improvement comprising:

first means on one of said parts defining a scale; and
second means on the other of said parts in juxtaposition to the first means and defining a pointer, said scale bearing scale markings, said regulator regulating a gas flow, when each of said scale markings is in alignment with said pointer, demanded by said gas heated appliance when operated with one of said standardized gas types, at least one of said means being separable from said parts and include provision for attachment to the respective part after installation of the regulator.

3. In a regulator as set forth in claim 2,
wherein said housing part has an annular groove spaced inwardly from the outer surface thereof; and
wherein said ring part has a slot on the outer surface thereof parallel to the axis of the ring; and
including a C clip with a locking screw therethrough, said clip being hooked into the groove with the screw bearing against the outer surface of the housing part, said clip having a projection extending into said slot to lock the ring part against rotation.

4. In a regulator as set forth in claim 3, wherein said clip is formed of a continuous length of metal bent to shape with the projection being in juxtaposition to one end of the C, the juxtaposed portions being threaded to receive the locking screw.

5. In a gas flow regulator for controlling the flow of fuel gas to a gas heated appliance adapted to operate with a variety of standardized gas types and having a lower housing part and a ring part above said housing part and rotatable with respect to the housing part for establishing the required flow control condition, the improvement comprising:

first means on one of said parts defining a scale;
second means on the other of said parts in juxtaposition to the first means and defining a pointer, said scale bearing scale markings, said regulator regulating a gas flow, when each of said scale markings is in alignment with said pointer, demanded by said gas heated appliance when operated with one of said standardized gas types;
said housing part having an annular groove spaced inwardly from the outer surface thereof; and
said ring part having a slot on the outer surface thereof parallel to the axis of the ring; and
including a C clip with a locking screw therethrough, said clip being hooked into the groove with the screw bearing against the outer surface of the housing part, said clip having a projection extending into said slot to lock the ring part against rotation.

6. In a regulator as set forth in claim 5, wherein said clip is formed of a continuous length of metal bent to shape with the projection being in juxtaposition to one end of the C, the juxtaposed portions being threaded to receive the locking screw.

7. The method of preparing for use at a given site a gas flow regulator of the character having an adjusting ring part rotatable with respect to a body part to set the regulator for use with various standard types of gases such that the position of the ring varies in a particular sequence for the various types, said method comprising:

before installation at said site, releasably fixing said ring part at a position for a particular one of said types of gases;
installing said regulator at said site whereby at least one side of the regulator is readily accessible;

on said side of one of said parts affixing a row of indicia corresponding to said types in said sequence;

on said side of the other of said parts affixing a pointer in juxtaposition to the indicia for said particular one type of gas; and if the gas at said site differs from said particular one type releasing said ring part and rotating it until the pointer is juxtaposed with the indicia for the gas at said site, and then re-fixing said ring part.

References Cited

UNITED STATES PATENTS

| 1,530,094 | 3/1925 | Ryan | 137—505.4X |
| 1,641,892 | 9/1927 | Lane | 137—551X |

HENRY T. KLINKSIEK, Primary Examiner

U.S. Cl. X.R.

137—551, 383